(12) United States Patent
Hall et al.

(10) Patent No.: US 11,350,156 B2
(45) Date of Patent: May 31, 2022

(54) METHOD AND APPARATUS FOR IMPLEMENTING VIDEO STREAM OVERLAYS

(71) Applicant: Sony Interactive Entertainment Europe Limited, London (GB)

(72) Inventors: Simon John Hall, London (GB); Stephen Broadley, London (GB)

(73) Assignee: Sony Interactive Entertainment Europe Limited

( * ) Notice: Subject to any disclaimer, the term of this patent is extended or adjusted under 35 U.S.C. 154(b) by 0 days.

(21) Appl. No.: 16/082,692

(22) PCT Filed: Mar. 10, 2017

(86) PCT No.: PCT/GB2017/050660
§ 371 (c)(1),
(2) Date: Sep. 6, 2018

(87) PCT Pub. No.: WO2017/153775
PCT Pub. Date: Sep. 14, 2017

(65) Prior Publication Data
US 2019/0075351 A1    Mar. 7, 2019

(30) Foreign Application Priority Data

Mar. 11, 2016 (GB) .................... 1604207

(51) Int. Cl.
*H04N 21/431* (2011.01)
*H04N 5/45* (2011.01)
(Continued)

(52) U.S. Cl.
CPC .......... *H04N 21/4316* (2013.01); *H04N 5/45* (2013.01); *H04N 13/161* (2018.05);
(Continued)

(58) Field of Classification Search
CPC .............. H04N 13/332; H04N 13/361; H04N 21/4316; H04N 5/45; H04N 13/161;
(Continued)

(56) References Cited

U.S. PATENT DOCUMENTS 5,977,935 A * 11/1999 Yasukawa ............ G02B 27/017
340/980
8,179,423 B2 * 5/2012 Maruyama ........... H04N 13/366
348/42
(Continued)

FOREIGN PATENT DOCUMENTS

EP    2613551 A2    7/2013
EP    3427476 A1    1/2019
(Continued)

OTHER PUBLICATIONS

Combined British Search and Examination Report for Application No. GB1604207.9 dated Jul. 27, 2016, 9 pages.
(Continued)

*Primary Examiner* — John W Miller
*Assistant Examiner* — Humam M Satti
(74) *Attorney, Agent, or Firm* — Lerner, David, Littenberg, Krunholz & Mentlik, LLP

(57) ABSTRACT

A method is provided of processing a primary video stream to which an overlay may be applied, for display by a head mountable display. The method includes identifying one or more suitable regions in the primary video stream for the display of overlay content. A suitable region is a region detected to lack one or more first predetermined features or to include one or more second predetermined features. The method also includes generating metadata indicative of a location and a depth of the suitable regions for the display of the overlay content, and that defines how a change in the detected orientation of the head mountable display, by which
(Continued)

Figure 1:
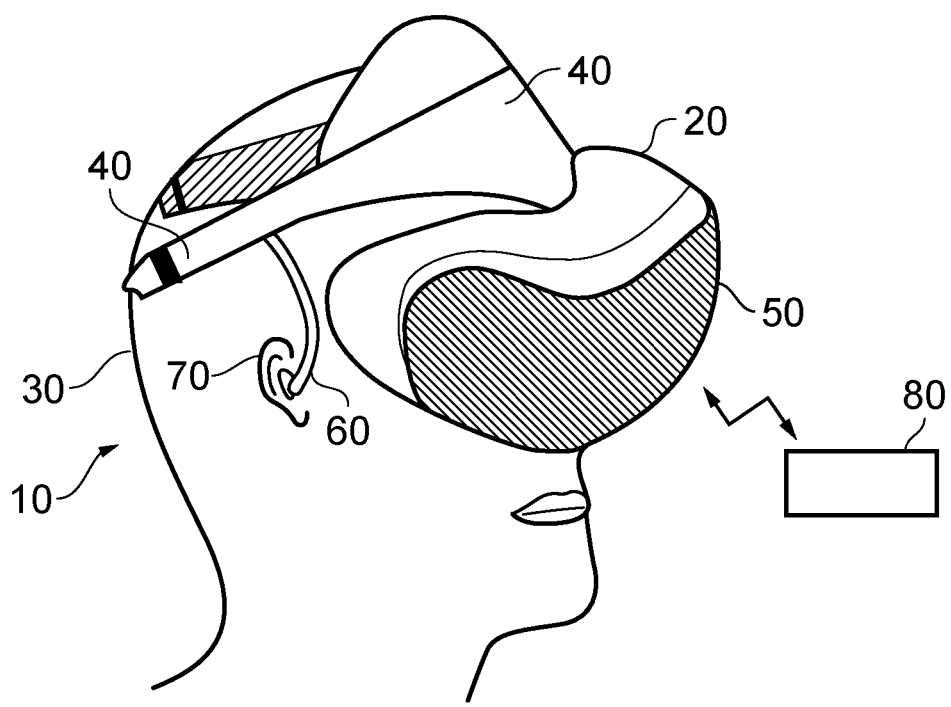

the primary video stream is displayed, changes the display of the overlay content. The method further includes providing the metadata in association with the primary video stream.

19 Claims, 9 Drawing Sheets

(51) Int. Cl.
| | | |
|---|---|---|
| *H04N 13/344* | (2018.01) | |
| *H04N 13/183* | (2018.01) | |
| *H04N 13/161* | (2018.01) | |
| *H04N 21/44* | (2011.01) | |
| *H04N 13/398* | (2018.01) | |
| *G02B 27/01* | (2006.01) | |

(52) U.S. Cl.
CPC ......... *H04N 13/183* (2018.05); *H04N 13/344* (2018.05); *H04N 13/398* (2018.05); *H04N 21/44008* (2013.01); *G02B 27/017* (2013.01)

(58) Field of Classification Search
CPC .. H04N 13/183; H04N 13/344; H04N 13/398; H04N 21/44008; H04N 5/2723; H04N 5/445; H04N 13/178; H04N 21/47; H04N 21/478; G06T 19/006; G06F 3/011; G02B 27/017

See application file for complete search history.

(56) References Cited

U.S. PATENT DOCUMENTS

| | | | | |
|---|---|---|---|---|
| 9,096,920 | B1* | 8/2015 | Gomez | G06F 3/04815 |
| 9,466,266 | B2* | 10/2016 | Hildreth | G06T 19/006 |
| 10,499,118 | B2* | 12/2019 | Todd | H04N 21/4402 |
| 2006/0197832 | A1* | 9/2006 | Yamada | G02B 27/0172 |
| | | | | 348/77 |
| 2010/0091096 | A1* | 4/2010 | Oikawa | G09G 5/377 |
| | | | | 348/53 |
| 2010/0321389 | A1 | 12/2010 | Gay et al. | |
| 2011/0234754 | A1* | 9/2011 | Newton | H04N 13/183 |
| | | | | 348/43 |
| 2012/0007959 | A1* | 1/2012 | Kwon | H04N 13/128 |
| | | | | 348/51 |
| 2012/0120200 | A1* | 5/2012 | Newton | H04N 13/10 |
| | | | | 348/46 |
| 2012/0127284 | A1* | 5/2012 | Bar-Zeev | G06T 19/006 |
| | | | | 348/53 |
| 2012/0249416 | A1 | 10/2012 | Maciocci et al. | |
| 2013/0033569 | A1 | 2/2013 | Bhat | |
| 2013/0050258 | A1 | 2/2013 | Liu et al. | |
| 2013/0201283 | A1 | 8/2013 | Broberg et al. | |
| 2014/0152530 | A1* | 6/2014 | Venkatesha | G01B 11/00 |
| | | | | 345/8 |
| 2014/0160163 | A1* | 6/2014 | Zhang | G06F 3/012 |
| | | | | 345/633 |
| 2014/0359656 | A1 | 12/2014 | Banica et al. | |
| 2015/0077416 | A1* | 3/2015 | Villmer | G06T 11/60 |
| | | | | 345/419 |
| 2015/0091943 | A1* | 4/2015 | Lee | G06F 3/013 |
| | | | | 345/633 |
| 2015/0145887 | A1* | 5/2015 | Forutanpour | G02B 27/017 |
| | | | | 345/633 |
| 2015/0339842 | A1 | 11/2015 | Gay et al. | |
| 2015/0341616 | A1* | 11/2015 | Siegel | H04N 13/261 |
| | | | | 348/54 |
| 2015/0347074 | A1* | 12/2015 | Park | H04N 5/7491 |
| | | | | 348/565 |
| 2016/0227267 | A1* | 8/2016 | Tsurutani | H04N 21/6193 |
| 2016/0379408 | A1* | 12/2016 | Wright | G06F 3/013 |
| | | | | 345/633 |
| 2017/0076461 | A1* | 3/2017 | Zhou | H04N 9/3194 |
| 2017/0164029 | A1* | 6/2017 | Dey | H04N 21/44218 |

FOREIGN PATENT DOCUMENTS

| | | |
|---|---|---|
| GB | 2516745 A | 2/2015 |
| GB | 2524269 A | 9/2015 |
| WO | 2010064118 A1 | 6/2010 |
| WO | 2017153775 A1 | 9/2017 |

OTHER PUBLICATIONS

International Search Report and Written Opinion for Application No. PCT/GB2017/050660 dated May 29, 2017, 15 pages.
Examination Report from Britain Application No. GB1604207.9 dated May 28, 2019, 5 pages.

* cited by examiner

LEFT  RIGHT

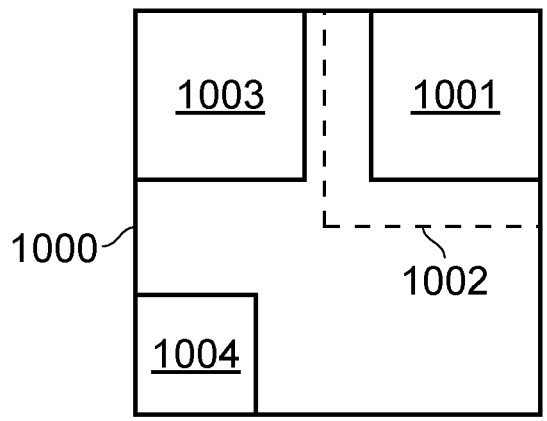
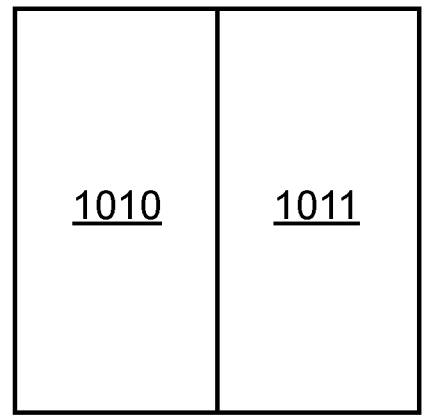
FIG. 10a FIG. 10b
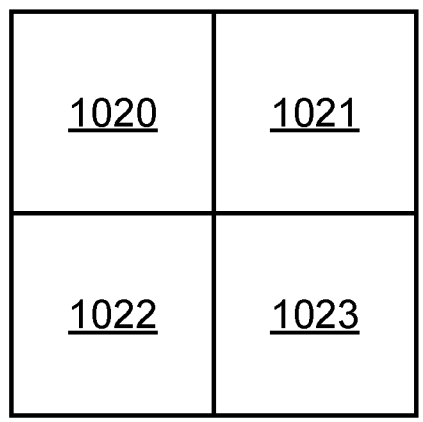
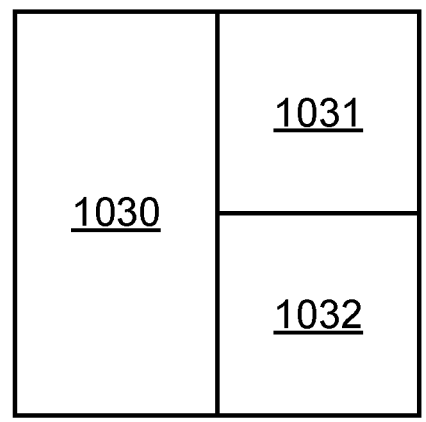
FIG. 10c FIG. 10d

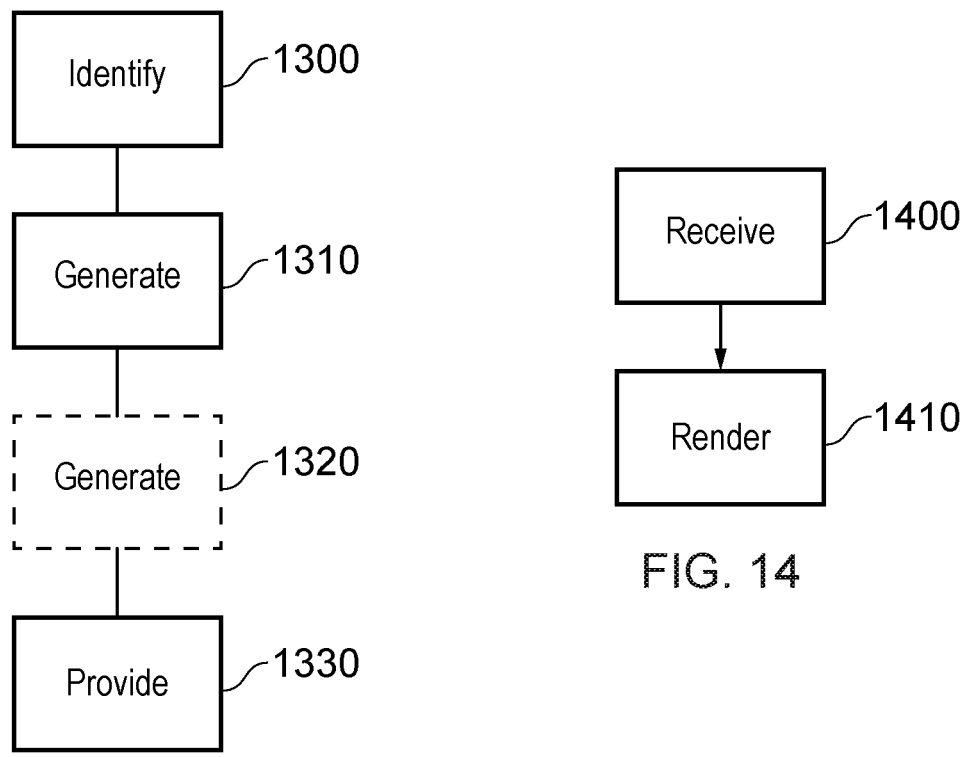
FIG. 13
FIG. 14
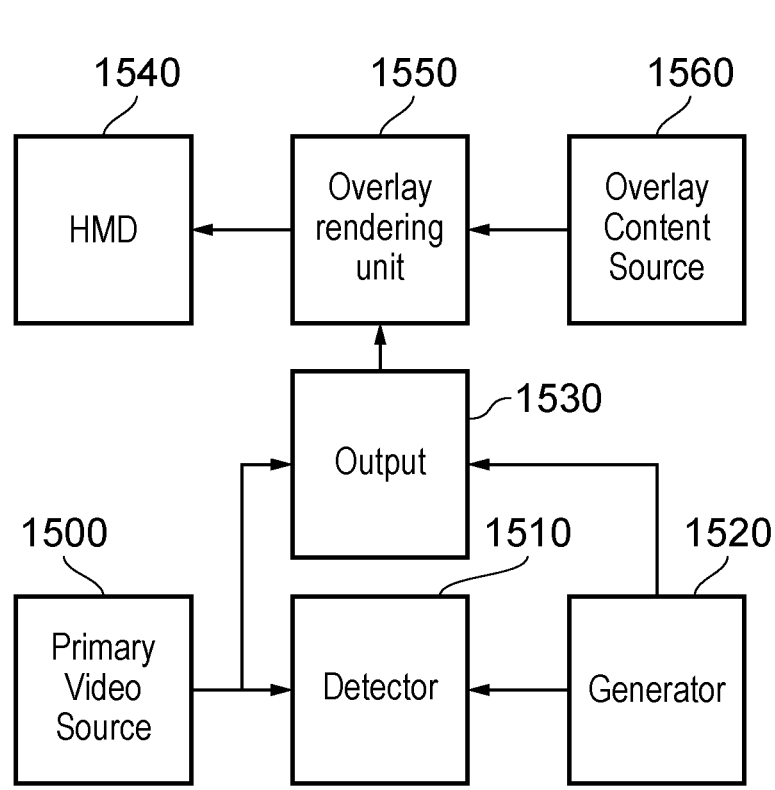
FIG. 15

METHOD AND APPARATUS FOR IMPLEMENTING VIDEO STREAM OVERLAYS

CROSS REFERENCE TO RELATED APPLICATIONS

The present application is a national phase entry under 35 U.S.C. § 371 of International Application No. PCT/GB2017/050660, filed Mar. 10, 2017, published in English, which claims the benefit of and priority to GB Patent Application No. 1604207.9, filed Mar. 11, 2016, the entire disclosure of which is incorporated by reference herein.

This disclosure relates to an image processing method and apparatus.

The user of a display device may often find it desirable to be supplied with extra information (for example, information related to their viewing activities such as the score of a concurrent sports game) whilst using the display. This can be achieved without the need for a second display device by using a content overlay method. This may be of the form of a so-called Picture-in-Picture (PiP) display in which multiple videos appear on the same display device, or in the form of individual modules that are displayed over an area of a displayed image.

PiP display has been proposed as a way to provide users with representations of multiple video streams on the same screen. An example application of this is to monitor what is happening on another channel while watching content from a primary source, such as another TV channel or video from an external source. This allows a user to avoid advertisements by switching to another video source, without missing the restarting of the programme that they are interested in, or to view the action from more than one sports game at a time for example.

Overlays are used in many different video-based applications with the increase in available processing power in devices that supply video. This has allowed many devices that supply video content to display devices, such as a Sony® PlayStation® games console, to run multiple processes simultaneously. This allows for further information to be presented to users (such as friend lists, achievement information, play statistics and the like) without having to exit the current application or requiring the current application to present the information itself.

Overlays are also used as a method of providing advertisements. In this manner, advertisements may be located at a particular point in the image such as on a billboard or so as to form some association with an in-video object. By being supplied separately to the video, the advertisements can be applied to the video content after it has been generated which allows it to be added or removed by advertisers at their discretion.

It is well known how to apply an overlay to a video stream in the context of 2D videos. However, these techniques are not sufficient to solve the problem of applying an overlay to a stereoscopic video stream without producing visual artefacts.

This disclosure is defined by claim 1, with further respective aspects and features of the disclosure defined in the appended claims.

Figure 2:
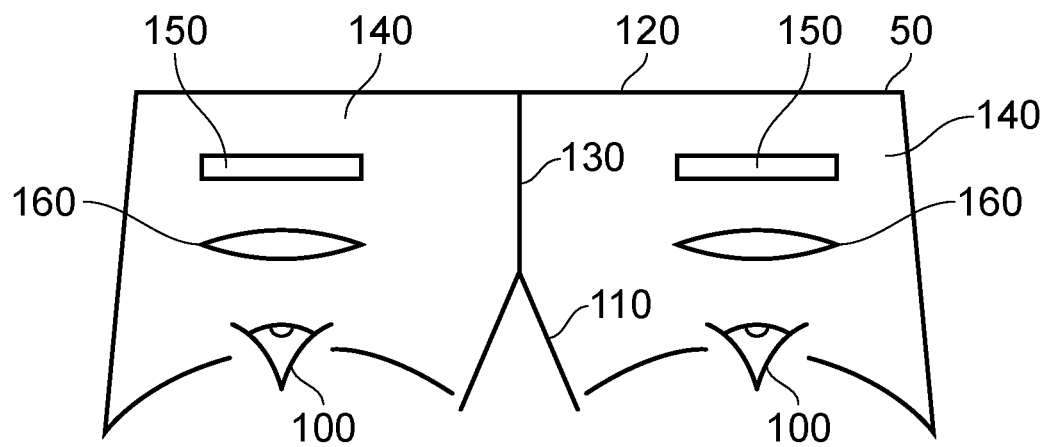
Figure 3:
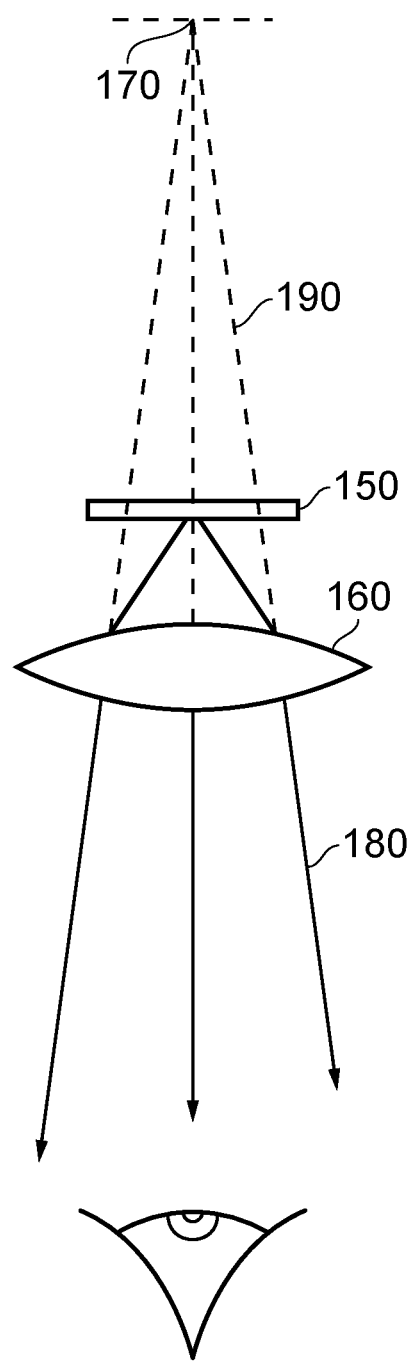
Figure 5:
Figure 4:
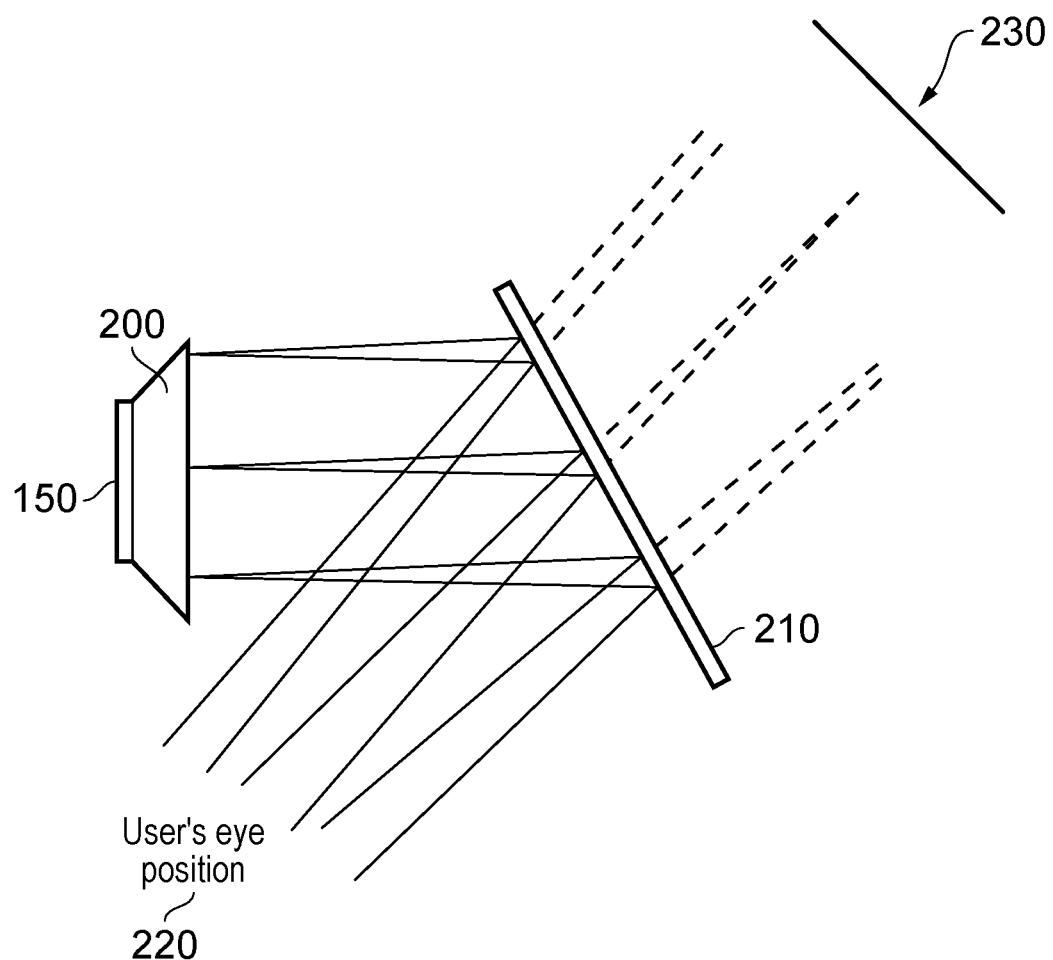
Figure 6:
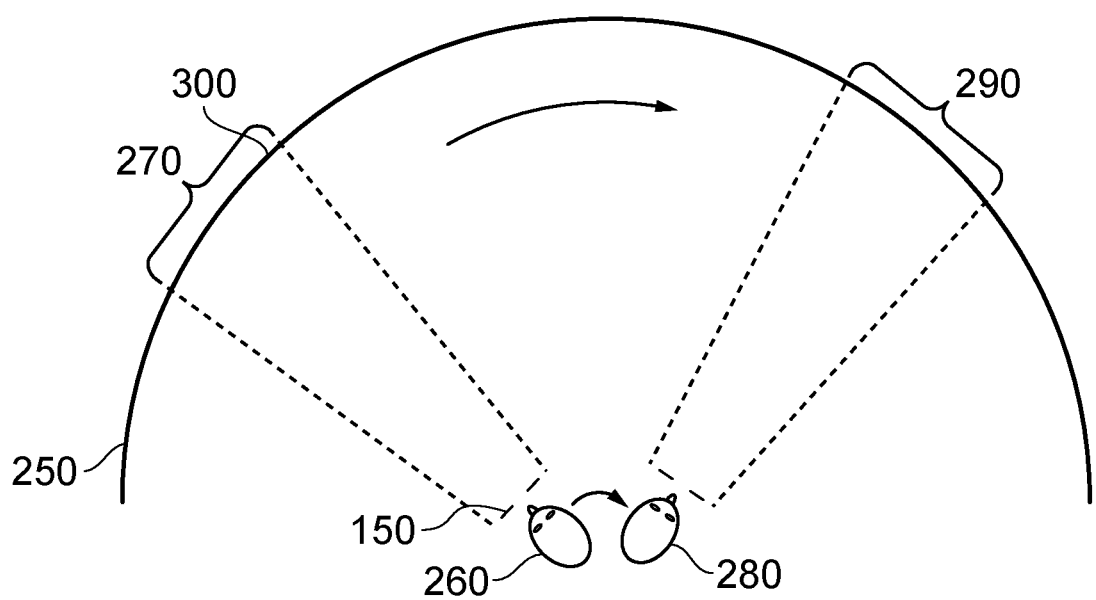
Figure 7A:
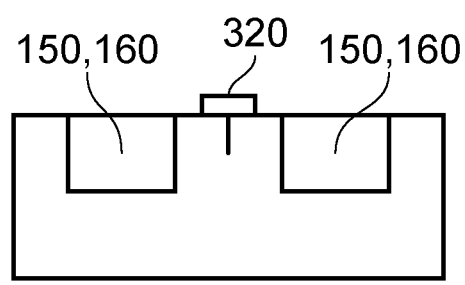
Figure 7B:
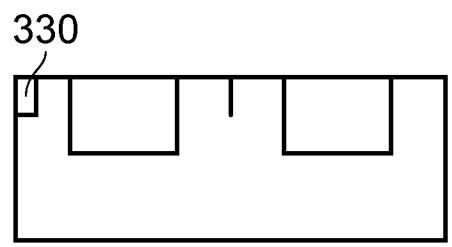
Figure 8:
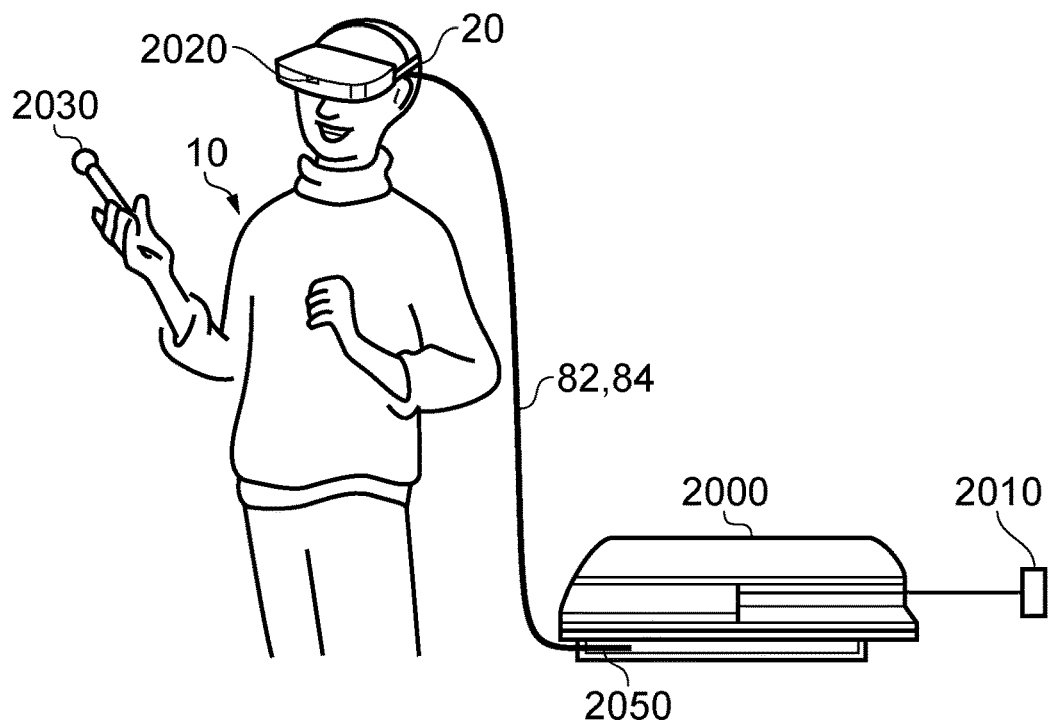
Figure 9:
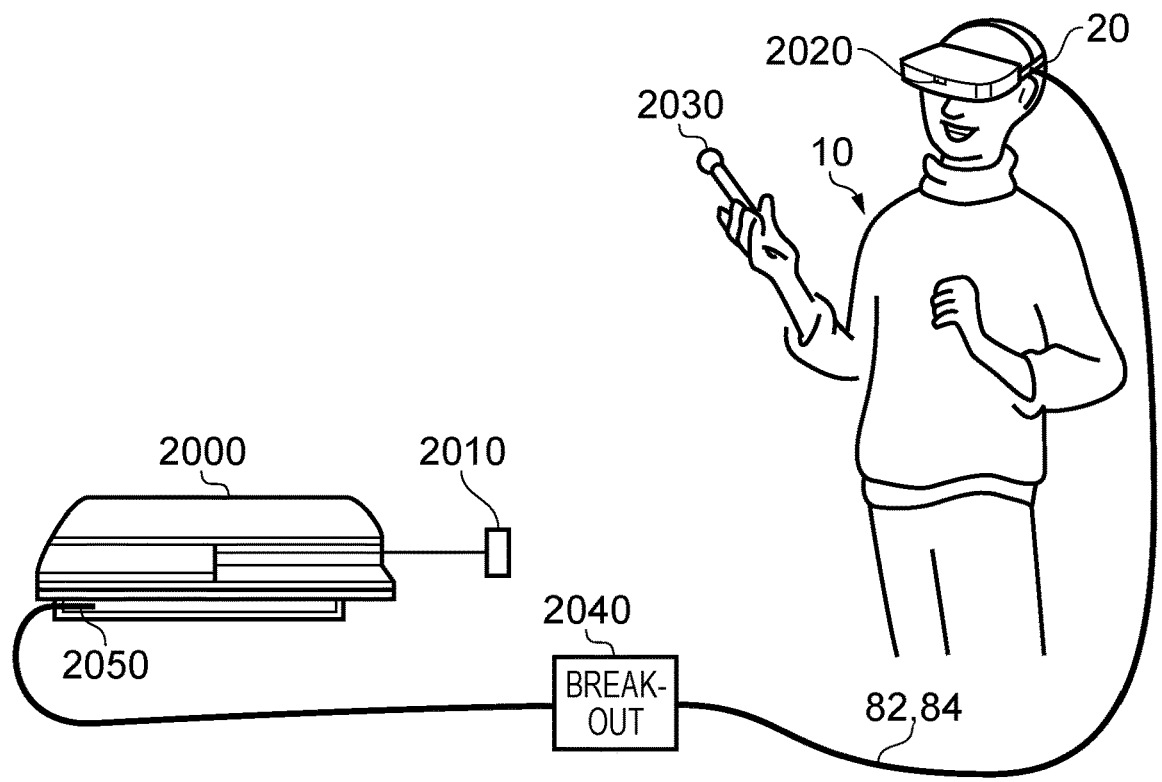
Figure 11A:
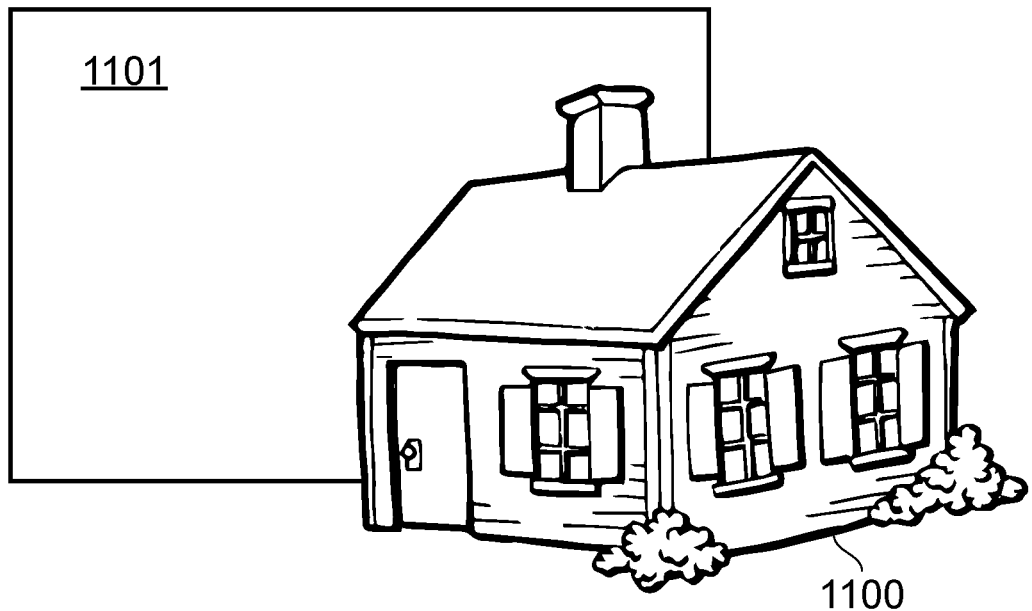
Figure 11B:
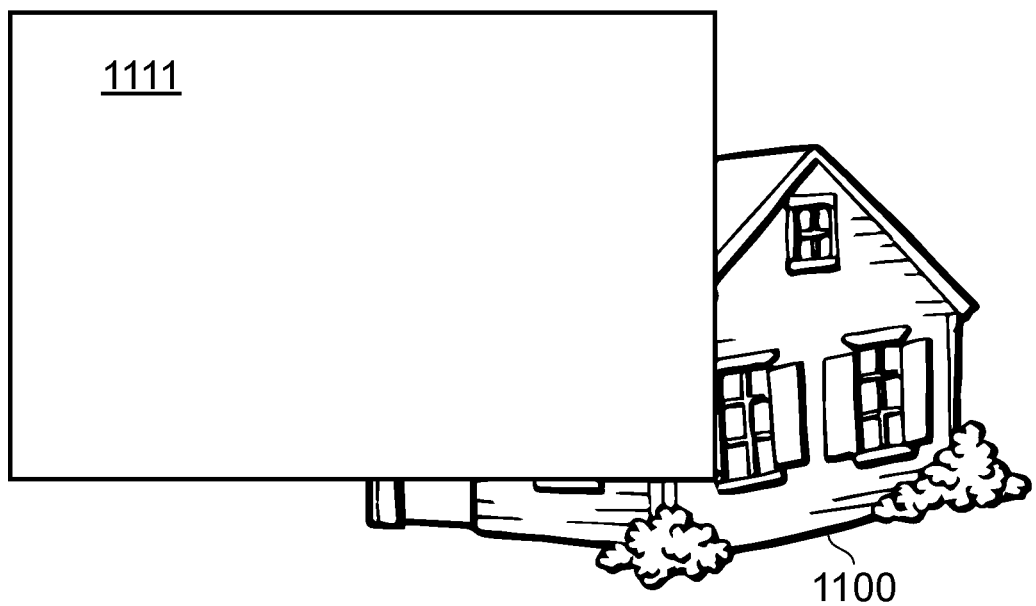
Figure 12:
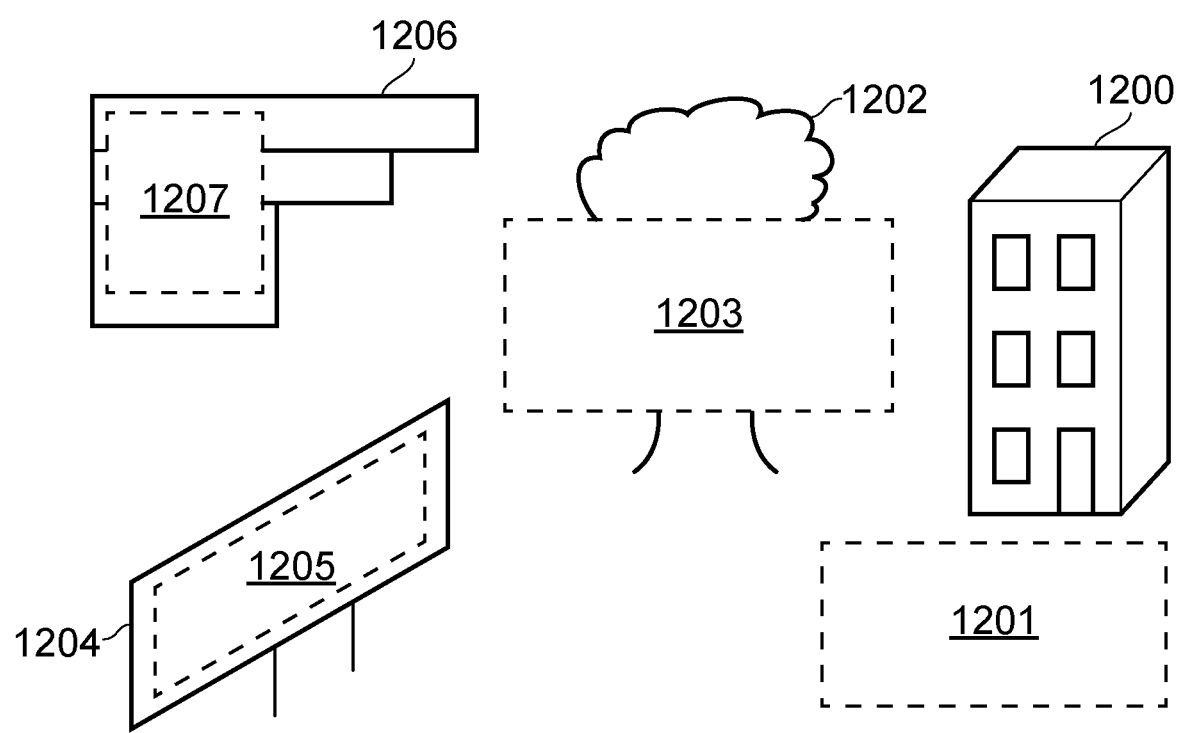

Embodiments of the disclosure will now be described with reference to the accompanying drawings, in which:

FIG. 1 schematically illustrates an HMD worn by a user;
FIG. 2 is a schematic plan view of an HMD;
FIG. 3 schematically illustrates the formation of a virtual image by an HMD;
FIG. 4 schematically illustrates another type of display for use in an HMD;
FIG. 5 schematically illustrates a pair of stereoscopic images;
FIG. 6 schematically illustrates a change of view of user of an HMD;
FIGS. 7a and 7b schematically illustrate HMDs with motion sensing;
FIGS. 8 and 9 schematically illustrate a user wearing an HMD connected to a Sony® PlayStation® games console;
FIGS. 10a, 10b, 10c and 10d schematically illustrate a selection of content display arrangements;
FIGS. 11a and 11b schematically illustrate occlusion issues encountered with a 3D overlay;
FIG. 12 schematically illustrates candidate regions for the display of an overlay;
FIGS. 13 and 14 are schematic flowcharts illustrating image processing methods; and
FIG. 15 is a schematic diagram of a hardware arrangement.

Head-Mountable Displays

Embodiments of the present disclosure can provide an image processing method and apparatus to be used in conjunction with an HMD. The head mountable display may have a frame to be mounted onto an viewer's head, the frame defining one or two eye display positions which, in use, are positioned in front of a respective eye of the viewer and a respective display element is mounted with respect to each of the eye display positions, the display element providing a virtual image of a video display of a video signal from a video signal source to that eye of the viewer. In some embodiments, the display may be referred to as an immersive display, in that in normal use it fills at least a threshold angular range (for example, at least 40°) of the field of view of the user.

Referring now to FIG. 1, a user 10 is wearing an HMD 20 on the user's head 30. The HMD comprises a frame 40, in this example formed of a rear strap and a top strap, and a display portion 50.

The HMD of FIG. 1 completely obscures the user's view of the surrounding environment. All that the user can see is the pair of images displayed within the HMD.

The HMD has associated headphone earpieces 60 which fit into the user's left and right ears 70. The earpieces 60 replay an audio signal provided from an external source, which may be the same as the video signal source which provides the video signal for display to the user's eyes.

In operation, a video signal is provided for display by the HMD. This could be provided by an external video signal source 80 such as a video games machine or data processing apparatus (such as a personal computer), in which case the signals could be transmitted to the HMD by a wired or a wireless connection. Examples of suitable wireless connections include Bluetooth (R) connections. Audio signals for the earpieces 60 can be carried by the same connection. Similarly, any control signals passed from the HMD to the video (audio) signal source may be carried by the same connection.

Accordingly, the arrangement of FIG. 1 provides an example of a head-mountable display system comprising a frame to be mounted onto an observer's head, the frame defining one or two eye display positions which, in use, are positioned in front of a respective eye of the observer and a display element mounted with respect to each of the eye display positions, the display element providing a virtual image of a video display of a video signal from a video signal source to that eye of the observer.

FIG. 1 shows just one example of an HMD. Other formats are possible: for example an HMD could use a frame more similar to that associated with conventional eyeglasses, namely a substantially horizontal leg extending back from the display portion to the top rear of the user's ear, possibly curling down behind the ear. In other examples, the user's view of the external environment may not in fact be entirely obscured; the displayed images could be arranged so as to be superposed (from the user's point of view) over the external environment. An example of such an arrangement will be described below with reference to FIG. 4.

In the example of FIG. 1, a separate respective display is provided for each of the user's eyes. A schematic plan view of how this is achieved is provided as FIG. 2, which illustrates the positions 100 of the user's eyes and the relative position 110 of the user's nose. The display portion 50, in schematic form, comprises an exterior shield 120 to mask ambient light from the user's eyes and an internal shield 130 which prevents one eye from seeing the display intended for the other eye. The combination of the user's face, the exterior shield 120 and the interior shield 130 form two compartments 140, one for each eye. In each of the compartments there is provided a display element 150 and one or more optical elements 160. The way in which the display element and the optical element(s) cooperate to provide a display to the user will be described with reference to FIG. 3.

Referring to FIG. 3, the display element 150 generates a displayed image which is (in this example) refracted by the optical elements 160 (shown schematically as a convex lens but which could include compound lenses or other elements) so as to generate a virtual image 170 which appears to the user to be larger than and significantly further away than the real image generated by the display element 150. As an example, the virtual image may have an apparent image size (image diagonal) of more than 1 m and may be disposed at a distance of more than 1 m from the user's eye (or from the frame of the HMD). In general terms, depending on the purpose of the HMD, it is desirable to have the virtual image disposed a significant distance from the user. For example, if the HMD is for viewing movies or the like, it is desirable that the user's eyes are relaxed during such viewing, which requires a distance (to the virtual image) of at least several metres. In FIG. 3, solid lines (such as the line 180) are used to denote real optical rays, whereas broken lines (such as the line 190) are used to denote virtual rays.

An alternative arrangement is shown in FIG. 4. This arrangement may be used where it is desired that the user's view of the external environment is not entirely obscured. However, it is also applicable to HMDs in which the user's external view is wholly obscured. In the arrangement of FIG. 4, the display element 150 and optical elements 200 cooperate to provide an image which is projected onto a mirror 210, which deflects the image towards the user's eye position 220. The user perceives a virtual image to be located at a position 230 which is in front of the user and at a suitable distance from the user.

In the case of an HMD in which the user's view of the external surroundings is entirely obscured, the mirror 210 can be a substantially 100% reflective mirror. The arrangement of FIG. 4 then has the advantage that the display element and optical elements can be located closer to the centre of gravity of the user's head and to the side of the user's eyes, which can produce a less bulky HMD for the user to wear. Alternatively, if the HMD is designed not to completely obscure the user's view of the external environment, the mirror 210 can be made partially reflective so that the user sees the external environment, through the mirror 210, with the virtual image superposed over the real external environment.

In the case where separate respective displays are provided for each of the user's eyes, it is possible to display stereoscopic images. An example of a pair of stereoscopic images for display to the left and right eyes is shown in FIG. 5. The images exhibit a lateral displacement relative to one another, with the displacement of image features depending upon the (real or simulated) lateral separation of the cameras by which the images were captured, the angular convergence of the cameras and the (real or simulated) distance of each image feature from the camera position.

Note that the lateral displacements in FIG. 5 could in fact be the other way round, which is to say that the left eye image as drawn could in fact be the right eye image, and the right eye image as drawn could in fact be the left eye image. This is because some stereoscopic displays tend to shift objects to the right in the right eye image and to the left in the left eye image, so as to simulate the idea that the user is looking through a stereoscopic window onto the scene beyond. However, some HMDs use the arrangement shown in FIG. 5 because this gives the impression to the user that the user is viewing the scene through a pair of binoculars. The choice between these two arrangements is at the discretion of the system designer.

In some situations, an HMD may be used simply to view movies and the like. In this case, there is no change required to the apparent viewpoint of the displayed images as the user turns the user's head, for example from side to side. In other uses, however, such as those associated with virtual reality (VR) or augmented reality (AR) systems, the user's viewpoint need to track movements with respect to a real or virtual space in which the user is located.

This tracking is carried out by detecting motion of the HMD and varying the apparent viewpoint of the displayed images so that the apparent viewpoint tracks the motion.

FIG. 6 schematically illustrates the effect of a user head movement in a VR or AR system.

Referring to FIG. 6, a virtual environment is represented by a (virtual) spherical shell 250 around a user. Because of the need to represent this arrangement on a two-dimensional paper drawing, the shell is represented by a part of a circle, at a distance from the user equivalent to the separation of the displayed virtual image from the user. A user is initially at a first position 260 and is directed towards a portion 270 of the virtual environment. It is this portion 270 which is represented in the images displayed on the display elements 150 of the user's HMD.

Consider the situation in which the user then moves his head to a new position and/or orientation 280. In order to maintain the correct sense of the virtual reality or augmented reality display, the displayed portion of the virtual environment also moves so that, at the end of the movement, a new portion 290 is displayed by the HMD.

So, in this arrangement, the apparent viewpoint within the virtual environment moves with the head movement. If the head rotates to the right side, for example, as shown in FIG. 6, the apparent viewpoint also moves to the right from the user's point of view. If the situation is considered from the aspect of a displayed object, such as a displayed object 300, this will effectively move in the opposite direction to the head movement. So, if the head movement is to the right, the apparent viewpoint moves to the right but an object such as the displayed object 300 which is stationary in the virtual environment will move towards the left of the displayed image and eventually will disappear off the left-hand side of the displayed image, for the simple reason that the displayed portion of the virtual environment has moved to the right whereas the displayed object 300 has not moved in the virtual environment. Similar considerations apply to the up-down component of any motion.

FIGS. 7a and 7b schematically illustrated HMDs with motion sensing. The two drawings are in a similar format to that shown in FIG. 2. That is to say, the drawings are schematic plan views of an HMD, in which the display element 150 and optical elements 160 are represented by a simple box shape. Many features of FIG. 2 are not shown, for clarity of the diagrams. Both drawings show examples of HMDs with a motion detector for detecting motion of the observer's head.

In FIG. 7a, a forward-facing camera 320 is provided on the front of the HMD. This does not necessarily provide images for display to the user (although it could do so in an augmented reality arrangement). Instead, its primary purpose in the present embodiments is to allow motion sensing by a so-called optical flow method involving detecting inter-image motion of image features captured by the camera 320. In these arrangements, the motion detector comprises a camera mounted so as to move with the frame; and an image comparator operable to compare successive images captured by the camera so as to detect inter-image motion.

FIG. 7b makes use of a hardware motion detector 330. This can be mounted anywhere within or on the HMD. Examples of suitable hardware motion detectors are piezoelectric accelerometers or optical fibre gyroscopes. It will of course be appreciated that both hardware motion detection and camera-based motion detection can be used in the same device, in which case one sensing arrangement could be used as a backup when the other one is unavailable, or one sensing arrangement (such as the camera) could provide data for changing the apparent viewpoint of the displayed images, whereas the other (such as an accelerometer) could provide data for image stabilisation.

Games Console and HMD

FIG. 8 schematically illustrates a user wearing an HMD connected to a Sony® PlayStation® games console 2000 as an example of a base device (corresponding to the external video source 80 of FIG. 1). A specific example of a base device is a PlayStation 4® games console. The games console 2000 is connected to a mains power supply 2010 and (optionally) to a main display screen (not shown). A cable, acting as the cables 82, 84 discussed above (and so acting as both power supply and signal cables), links the HMD 20 to the games console 2000 and is, for example, plugged into a USB socket 2020 on the console 2000. Note that in the present embodiments, a single physical cable is provided which fulfils the functions of the cables 82, 84. In FIG. 8, the user is also shown holding a hand-held controller 2030 which may be, for example, a Sony® Move® controller which communicates wirelessly with the games console 2000 to control (or to contribute to the control of) game operations relating to a currently executed game program.

The video displays in the HMD 20 are arranged to display images generated by the games console 2000, and the earpieces 60 in the HMD 20 are arranged to reproduce audio signals generated by the games console 2000. Note that if a USB type cable is used, these signals will be in digital form when they reach the HMD 20, such that the HMD 20 comprises a digital to analogue converter (DAC) to convert at least the audio signals back into an analogue form for reproduction.

Images from the camera 2050 mounted on the HMD 20 are passed back to the games console 2000 via the cable 82, 84. Similarly, if motion or other sensors are provided at the HMD 20, signals from those sensors may be at least partially processed at the HMD 20 and/or may be at least partially processed at the games console 2000. The use and processing of such signals will be described further below.

The USB connection from the games console 2000 also provides power to the HMD 20, according to the USB standard.

FIG. 9 schematically illustrates a similar arrangement in which the games console is connected (by a wired or wireless link) to a so-called "break out box" acting as a base or intermediate device 2040, to which the HMD 20 is connected by a cabled link 82, 84. The breakout box has various functions in this regard. One function is to provide a location, near to the user, for some user controls relating to the operation of the HMD, such as (for example) one or more of a power control, a brightness control, an input source selector, a volume control and the like. Another function is to provide a local power supply for the HMD (if one is needed according to the embodiment being discussed). Another function is to provide a local cable anchoring point. In this last function, it is not envisaged that the break-out box 2040 is fixed to the ground or to a piece of furniture, but rather than having a very long trailing cable from the games console 2000, the break-out box provides a locally weighted point so that the cable 82, 84 linking the HMD 20 to the break-out box will tend to move around the position of the break-out box. This can improve user safety and comfort by avoiding the use of very long trailing cables.

It will be appreciated that the localisation of processing in the various techniques described in this application can be varied without changing the overall effect, given that an HMD may form part of a set or cohort of interconnected devices (that is to say, interconnected for the purposes of data or signal transfer, but not necessarily connected by a physical cable). So, processing which is described as taking place "at" one device, such as at the HMD, could be devolved to another device such as the games console (base device) or the break-out box. Processing tasks can be shared amongst devices. Source signals, on which the processing is to take place, could be distributed to another device, or the processing results from the processing of those source signals could be sent to another device, as required. So any references to processing taking place at a particular device should be understood in this context. Similarly, where an interaction between two devices is basically symmetrical, for example where a camera or sensor on one device detects a signal or feature of the other device, it will be understood that unless the context prohibits this, the two devices could be interchanged without any loss of functionality.

As mentioned above, in some uses of the HMD, such as those associated with virtual reality (VR) or augmented reality (AR) systems, the user's viewpoint needs to track movements with respect to a real or virtual space in which the user is located.

This tracking is carried out by detecting motion of the HMD and varying the apparent viewpoint of the displayed images so that the apparent viewpoint tracks the motion.

Overlays

FIGS. 10a, b, c and d show a number of possible configurations of an overlaid video stream on a display. These examples generally correspond to Picture-in-Picture (a smaller image within a larger) or Picture-outside-Picture (PoP) (images presented that are the same size).

FIG. 10a shows a display that consists of a dominant, primary image 1000 and a much smaller secondary image 1001 that is inset into the top right corner. This display method is advantageous in that the primary stream can be displayed at the same size as in normal usage, but the drawback is that an area is occluded by the secondary image. This can be managed by allowing the secondary image to be resized (1002), relocated (1003) or both (1004) in order to reduce the impact the PiP method has on the viewing of the primary image.

FIG. 10b shows a display that is split in half for display, such that two images may be shown at an equal size. Although the image shows a left image 1010 and a right image 1011, it is equally possible that the divide 1012 is implemented as a horizontal split of the display instead of a vertical. In this arrangement, the left and right images may be resized to make the best use of the space—matching the width of the image to half of the width of the display with an optional vertical stretch for example. Alternatively, the images could be cropped in order to more closely match them to the allotted display area for each image.

FIG. 10c illustrates an arrangement of 4 different images 1020, 1021, 1022 and 1023 that each occupy a quarter of the screen.

FIG. 10d shows a similar arrangement, but instead using 3 display regions of unequal sizes. The area 1030 covers half of the display area, while the two areas 1031 and 1032 occupy the other half together. The areas 1031 and 1032 could overlay half of the image 1030, or the image 1030 could be resized in avoid occlusion by the smaller images. This could be implemented with a number of arrangements of the different display areas, and each of the smaller areas 1031 and 1032 could be manipulated in the same manner as the secondary image 1001 in FIG. 10a—indeed, they may be manipulated separately to one another in order to have 3 display areas that are each of a different size.

It is possible that in any of the above arrangements the secondary images (or one of the left/right images in 10b) may have a lowered opacity in order to allow the image below (for example the primary image) to still be visible. While this may not be desirable in the case that the secondary image is a video stream, it can be extremely advantageous in the case of displayed text being the secondary image.

Any of the PiP or PoP display arrangements described above may be extended to Picture-and-Picture mode, in which the sound output is not restricted to that of a single picture. Instead the sound for the extra displays may be transmitted to a user through an external audio device, such as a pair of headphones connected to a device that is able to receive the audio data from the display system. Alternatively the sound for each piece of content could be transmitted by the same device, but this may not be desirable from a user's point of view unless the sounds from the secondary content are uncommon so as to reduce confusion.

While these methods may be applied freely to conventional 2D video content, more problems may arise when applying them to stereoscopic videos. This is because the present disclosure recognises that the depth at which an overlaid piece of content can be relevant, especially in the context of occlusion, in order to prevent a user from having a negative viewing experience.

Methods relating to a single overlaid video stream will now be described, although the methods could equally apply to multiple overlaid streams by extending the described techniques to multiple regions for display in the same images.

FIGS. 11a and 11b illustrate two examples of depth issues that may be encountered.

FIG. 11a shows a partial occlusion by a building 1100 in the image. The secondary image 1101 is represented by a visible portion and an occluded portion, the occlusion being caused by the rendering depth being chosen such that it is at the same depth as or behind a part of the building 1100. It could be the case that the position of the secondary image is also poorly selected, leading the whole of the secondary image to be rendered within (or simply behind) the building and thus wholly occluded.

FIG. 11b illustrates an alternative problem, in which the secondary image 1111 is rendered at a position and a depth such that it occludes a large portion of the building. While in some cases this may be desirable, for example when the building is of no interest to the viewer, in other cases it may be an essential object that is hidden by the secondary image such as a main character in a film or a game or some element of a heads-up display (HUD).

It is also possible that the overlay is rendered at a distance that is not consistent with the presently displayed primary image. For example, a user may be presented with a view of a wall at a distance of 1 m but an overlay (intended to be rendered in front of the wall, for visibility) may have been assigned a depth value of 5 m. This will clearly appear visually odd to the user, having a negative impact on their viewing experience.

It is therefore desirable that the secondary image is displayed at a position and size so as to limit interference with the primary image, as with the 2D case, but also at a depth that does not cause viewing problems. While varying opacity may go some way towards alleviating some aspects of this problem, instead a method is provided that utilises information about where it is suitable to render an overlay in a primary image.

Suitable areas in an image for display of overlaid content could be determined either as regions lacking one or more first predetermined features (for example, features which are identified (for example, according to a predetermined list or schedule of features) as being important to the user (such as key objectives in a game, or the scoreboard when viewing sports) or regions that include one or more second predetermined features, for example being features a user would be comfortable viewing further content on (such as TV screens or billboards present in the image, again optionally defined by a predetermined list or schedule of features).

Therefore, examples of first predetermined features include: game features such as game characters or representations of game characters, game objectives such as predetermined locations in a virtual (displayed) environment, game information display areas such as scoring, game guidance or other information display areas, or the like. Examples of second predetermined features include features in the virtual (displayed) environment at which information can be displayed, such as billboards, screens, walls and the like. In either case, the system can detect the presence or absence (as the case may be) of such features as the original (primary) images are rendered or by image analysis of the original (primary) images.

FIG. 12 schematically illustrates an image of an environment which is displayed to a user. Each of the elements 1200, 1202, 1204 and 1206 has an associated apparent depth within the image. The application generating the video stream containing this image also provides an associated set of metadata which identifies regions of the image that are suitable for a PiP display.

The region 1201 is identified as being in an area of the image that does not interfere with objects within the image—the region is arranged below the building 1200 so as to avoid occluding it or being occluded by it.

The region 1203 partially occludes the tree 1202. This may be in response to the tree 1202 being identified as an insignificant feature in the image, or some other metric which determines that the occlusion of the tree by the information is not a concern.

The region 1205 is arranged so as to coincide with the surface of the billboard 1204, as this is a natural place to expect to see an image. It may be that the application generating the game purposely leaves such areas blank, to be populated with PiP content. This arrangement could also apply equally well to other common display areas—for example screens in a virtual cinema, or television sets found in the image. This example also illustrates that the depth of the secondary content as it is rendered in the displayed image may not be constant, here it matches the depth of the billboard so as to appear as if it is actually on the surface of the billboard.

The region 1207 is positioned in the same two dimensional area of the display as the HUD element 1206. This could be in response to the fact that often points of interest in applications such as games may commonly be arranged in more central areas away from the HUD elements and therefore an overlap with an HUD element means that there will rarely be interference with the rest of the video content. If the application determines that the HUD element 1206 should be in the foreground, it can have a low degree of opacity applied so that the secondary video is still visible in the background. Alternatively, the video could be made more prominent by presenting it in front of the HUD element 1206 albeit with a low opacity itself. As another solution, the HUD element 1206 could be rearranged to another portion of the screen by the application generating the video stream upon detection of the use of the PiP display.

Overlay Metadata

In examples, information determining regions of an image that are suitable for the display of a PiP image is presented to overlay circuitry or other processing in the form of metadata. Examples of the contents of this metadata are provided below.

A method of image processing is schematically illustrated in FIG. 13, which illustrates a method of processing a primary video stream to which an overlay may be applied, for display by a head mountable display.

A step 1300 involves identifying one or more suitable regions in the primary video stream for the display of overlay content. At the step 1300, suitable regions for the display of a PiP image are identified, a suitable region being a region detected to lack one or more first predetermined features or to include one or more second predetermined features. This may take into account many factors such as possibility of occlusion, available display area and the importance of features in the region.

A step 1310 involves generating metadata indicative of a location and a depth of the suitable regions for the display of the overlay content, and that defines how a change in the detected orientation of the head mountable display, by which the primary video stream is displayed, changes the display of the overlay content. Metadata is generated which identifies these regions. This may, for example, be in the form of a 2D mask which indicates regions of the picture to be replaced by other content on a pixel-by-pixel basis, for example. Alternatively, the information could be supplied as a list of 'bounding boxes' which provide details about (for example) rectangular regions (defined, for example, by pixel locations of two opposite corners, or by the pixel location of a vertex and a size in pixels) where in the image other content could be placed by describing region boundaries.

Metadata is also generated which describes, for example, the z-depth information for each region. This information indicates to the overlay hardware where (depth-wise) the secondary image should be rendered. This can be either in the form of a single z-depth value, or as a range of allowed values.

This information generated in the step 1310 may correspond to single pixels or entire regions. Alternatively, it could be defined as a function of the 2D coordinates of the image for each region—as a whole region may not require the same z-depth (as shown with reference to 1205 of FIG. 12). For example, the information could be provided as a 10×10 grid for each eye, using a low resolution meaning less of a burden on the application when generating this information.

An optional step 1320 involves generating metadata that defines how a change in the detected orientation of a head mountable display, by which the primary video stream is displayed, changes the display of the overlay content. Here, metadata is generated that describes how the location of the overlay should change in response to a head rotation by the user of the HMD. This information may be used to ensure that the overlay moves correctly in the displayed video, both in the 2D plane and the depth direction. For example, if the overlaid content were to remain stationary then not only is there the risk of occluding an object that has moved (relative to the overlay), but there is also the risk of impairing the user experience due to elements not moving as they would be expected to. Alternatively, this information could be used to cause the overlay not to move, or to become more or less prominent with certain detected head motion.

Examples of the metadata are as follows:

The metadata indicating a location can comprise metadata indicative of positions with respect to a two-dimensional mask at a lower resolution than a pixel resolution of the primary video stream (an example being a 10×10 division of the video field of view into 100 regions).

The metadata indicating a location can comprise image coordinate information defining one or more bounding boxes within which overlay content can be displayed.

The metadata indicating a depth can comprise one or more indications of perceived depth relative to the wearer of a head mountable display.

The metadata indicating a depth can define one or more stereoscopic disparities.

An example of such metadata is as follows:

Frame_number (defines the video frame to which the metadata applies, or may be implied by the video data being generated, delivered or displayed at the time of delivery of the metadata)

Mask_coordinates (such as upper left and lower right coordinates) or

Mask_positions (as pixels or blocks)

Depth_information (by pixel, block or mask)

Head_movement_data (does the overlay move or stay stationary with head movement?)

This metadata, when supplied to overlay processing, is used to position the generated overlay in the correct 3D position within the image. Although generally this information should be generated by the application that generates the primary content itself, it is possible that the information could be generated retrospectively by stereoscopic image analysis methods to determine the appropriate depth information for suitable positions for an overlay to be rendered. Alternatively, the overlay could be manipulated by the user.

Further information may also be provided that is considered when producing the overlaid video stream. For example, an indication from the source of the overlay content may cause the overlay to be displayed more prominently—either in a more central position, with a greater size or with a greater opacity for example. Indications could include 'goal alerts' from an overlaid sports game, or if the external source is a live video feed (such as a security camera or a baby monitor) a detected noise or significant detected motion may serve as an indication that the user would be interested in viewing the overlaid content more clearly.

A step 1330 involves providing the metadata in association with the primary video stream.

The metadata may be provided in a number of formats, not necessarily as described above with reference to FIG. 13. For example, the application may generate information in the form of a 'desired area' or a 'desired mesh'. In this case, matrix and vertex information is supplied to the overlay hardware that describes exactly how the overlay should be rendered. In this case, it may also be useful to provide information about cropping or resizing an image in order to fit the images to this mesh.

FIG. 14 is a schematic flowchart illustrating the use that may be made of the signals generated by the method of FIG. 13. In particular, FIG. 14 illustrates a method of processing a primary video stream to apply an overlay, the method comprising:

receiving (at a step 1400), at an overlay rendering unit, a primary video stream, overlay content and metadata indicative of a location and a depth of the suitable regions for the display of the overlay content, and that defines how a change in the detected orientation of the head mountable display, by which the primary video stream is displayed, changes the display of the overlay content; and rendering (at a step 1410) the overlay content onto the primary video stream at a location and depth defined by the metadata, to generate a display video stream.

Next, the techniques shall be described with reference to example hardware or software-controlled hardware arrangements. It will be appreciated that such hardware may be a computer. It will be appreciated that the software may be provided by various providing media, such as a non-transitory machine-readable storage medium which stores computer software which, when executed by a computer, causes the computer to perform any of the methods described here.

The steps of FIGS. 13 and/or 14 may be performed or implemented by computer software which, when executed by a computer, causes the computer to carry out such methods. The software may be provided by a machine-readable non-transitory storage medium which stores such computer software.

FIG. 15 schematically illustrates an arrangement of hardware operable to provide an overlay at a determined suitable position and depth. FIG. 15 illustrates image processing apparatus for processing a primary video stream to which an overlay may be applied, for display by a head mountable display, and image processing apparatus for processing a primary video stream to apply an overlay.

A primary video source 1500, for example implemented by a Sony® PlayStation® games console, is responsible for running the application that generates or produces the main video data (a primary video stream) for display, and to which an overlay is to be applied. The primary video stream may be produced, for example, as a three dimensional video stream (for display on a three dimensional display of an HMD such as an HMD 1540, see below). Further to this, the games console comprises a detector 1510 to detect or identify one or more suitable regions for the display of overlay content. A generator 1520 generates metadata that describes or defines the regions of the images that are suitable for displaying an overlay in addition to the supplementary information that aids the correct placement of the overlay information such as depth information. The metadata may be indicative of a location and a depth of the suitable regions for the display of the overlay content. The metadata may define how (in other words, a manner by which) a change in the detected orientation of a head mountable display, by which the primary video stream is displayed, changes the display of the overlay content.

This information is passed to output circuitry 1530 for output, the circuitry 1530 providing the metadata in association with the primary video stream. Here, "in association with" could imply that the metadata is embedded or encoded into the primary video stream, or that the metadata is provided separately but in a manner which allows the overlay rendering unit (see below) to act on the metadata in processing the primary video stream.

Associated with an HMD 1540 is an overlay rendering unit 1550 which receives the primary video stream and metadata along with overlay content (one or more instances of video, still images, graphics or the like) from an overlay content source 1560. Where the overlay content is or includes a moving image, successive frames of the primary video stream may have overlaid on them overlay content according to a next frame of the overlay content, or according to a temporally closest (or a temporally nearest preceding) frame of the overlay content.

Multiple or plural instances of overlay content can be handled in this way. Multiple respective sets of metadata can define regions for overlay of overlay content, and each one of these (or some of these) can have respective overlay content overlaid on them.

The overlay content source 1560 is responsible for generating or providing the content that is to be displayed as an overlay on the primary video. This may be a common video providing device, such as a TV tuner or a mobile phone, or another device that has video or text output capabilities such as a video camera. The overlay content source 1560 may be in communication with the primary video source 1500, for example to indicate that there is the desire to overlay content. Alternatively, the overlay content source 1560 may be a part of the primary video source 1560 provided that the device is capable of processing two sets of content—such as a computer game and video content streamed through the internet. The overlay content generator 1560 passes this overlay content to the overlay rendering unit 1550.

The overlay rendering unit 1550 is a piece of apparatus that combines the primary video with the overlay content according to the information provided to it by the metadata generator 1520 regarding the suitable locations for the overlay content to be reproduced. The overlay rendering unit receives a primary video stream, overlay content and metadata indicative of a location and a depth of the suitable regions for the display of the overlay content. The overlay rendering unit generates a display video stream by rendering the overlay content onto the primary video stream at a location and depth defined by the metadata. The display video stream is displayed by the HMD 1540.

In some embodiments, the overlay rendering unit may be a part of the primary video source 1500, or it may be a part of the HMD 1540, separate from a games console, or it may be a part of the overlay content source 1560, and in other embodiments it may be found as a separate piece of apparatus. Once the overlay rendering unit has combined the two pieces of content, it passes the combined content to the HMD 1540 for display.

An example image processing apparatus comprises the units 1500, 1510, 1520, 1530. Another example image processing apparatus comprises the unit 1550. An example HMD system comprises the units 1550, 1540. Another example of an apparatus or system comprises all of the units shown in FIG. 15.

Various examples of these arrangements are possible.

For example, the HMD 1540 could include the overlay rendering unit and either of the primary video source or the overlay content source. Video content from the other of the primary video source and the overlay content source could be provided by an external wired or wireless connection to the HMD 1540, such as an HDMI socket on the HMD 1540. In another example, the overlay generator could be provided by a PlayStation console, along with the primary video source. The generation of metadata discussed above could be as part of the generation of the primary video (in the case, for example, of a game program) or could be by image analysis of a primary content stream, for example by detecting depth information within the primary content stream (by detecting left-right image disparity at positions within the images) and/or by detecting image content or features.

Respective aspects and features are defined by the following numbered clauses.

1. A method of processing a primary video stream to which an overlay may be applied, for display by a head mountable display, the method comprising:
   identifying one or more suitable regions in the primary video stream for the display of overlay content, a suitable region being a region detected to lack one or more first predetermined features or to include one or more second predetermined features;
   generating metadata indicative of a location and a depth of the suitable regions for the display of the overlay content, and that defines how a change in the detected orientation of the head mountable display, by which the primary video stream is displayed, changes the display of the overlay content; and
   providing the metadata in association with the primary video stream.

2. A method according to clause 1, comprising:
   producing the primary video stream to which an overlay is to be applied;

3. A method according to clause 1 or clause 2, comprising:
   receiving, at an overlay rendering unit, the metadata, primary video stream and overlay content;
   rendering the overlay content onto the primary video stream at a location and depth defined by the metadata, to generate a display video stream.

4. A method according to clause 3, comprising:
   displaying the display video stream using a head mountable display.

5. A method according to clause 3 or clause 4, in which the overlay content comprises one or more video streams.

6. A method according to any of clauses 3 to 5, in which the overlay content comprises a plurality of overlay content streams.

7. A method according to any one of the preceding clauses, in which the primary video stream represents a three-dimensional video signal.

8. A method according to any one of the preceding clauses, in which the metadata indicating a location comprises metadata indicative of positions with respect to a two-dimensional mask at a lower resolution than a pixel resolution of the primary video stream.

9. A method according to any one of clauses 1 to 7, in which the metadata indicating a location comprises image coordinate information defining one or more bounding boxes within which overlay content can be displayed.

10. A method according to any of the preceding clauses, in which the metadata indicating a depth comprises one or more indications of perceived depth relative to the wearer of a head mountable display.

11. A method according to clause 10, in which the metadata indicating a depth defines one or more stereoscopic disparities.

12. A method of processing a primary video stream to apply an overlay for display by a head mountable display, the method comprising:
    receiving, at an overlay rendering unit, a primary video stream, overlay content and metadata indicative of a location and a depth of the suitable regions for the display of the overlay content a suitable region being a region detected to lack one or more first predetermined features or to include one or more second predetermined features, and that defines how a change in the detected orientation of the head mountable display, by which the primary video stream is displayed, changes the display of the overlay content; and
    rendering the overlay content onto the primary video stream at a location and depth defined by the metadata, to generate a display video stream.

13. A method according to clause 12, comprising:
    displaying the display video stream using a head mountable display.

14. A method according to clause 13, comprising:
    detecting changes in the orientation of the head mountable display; and
    varying the rendering of the display video stream in response to the detected changes, in a manner defined by the metadata.

15. Computer software which, when executed by a computer, causes the computer to carry out the method of any one of the preceding clauses.

16. A machine-readable non-transitory storage medium which stores computer software according to clause 15.

17. Image processing apparatus for processing a primary video stream to which an overlay may be applied for display by a head mountable display, the apparatus comprising:
    a detector to identify one or more suitable regions in the primary video stream for the display of overlay content a suitable region being a region detected to lack one or more first predetermined features or to include one or more second predetermined features;
    a generator to generate metadata indicative of a location and a depth of the suitable regions for the display of the overlay content and that defines how a change in the detected orientation of the head mountable display, by which the primary video stream is displayed, changes the display of the overlay content; and
    an output to provide the metadata in association with the primary video stream.

18. Image processing apparatus for processing a primary video stream to apply an overlay for display by a head mountable display, the apparatus comprising:
    an overlay rendering unit to receive a primary video stream, overlay content and metadata indicative of a location and a depth of the suitable regions for the display of the overlay content a suitable region being a region detected to lack one or more first predetermined features or to include one or more second predetermined features and that defines how a change in the detected orientation of the head mountable display, by which the primary video stream is displayed, changes the display of the overlay content;

the overlay rendering unit to generate a display video stream by rendering the overlay content onto the primary video stream at a location and depth defined by the metadata.

19. A head mountable display system comprising:
image processing apparatus according to clause 18; and
a head mountable display to display the display video stream.

It will be apparent that numerous modifications and variations of the present disclosure are possible in light of the above teachings. It is therefore to be understood that within the scope of the appended claims, the disclosure may be practised otherwise than as specifically described herein.

The invention claimed is:

1. A method of processing a primary video stream to which an overlay may be applied, for display by a head mountable display, the method comprising:
   identifying, by a detector, one or more suitable regions in the primary video stream for the display of overlay content, a suitable region being a region detected to lack one or more first predetermined features or to include one or more second predetermined features;
   generating, by a generator, metadata indicative of a location and a depth of the suitable regions for the display of the overlay content, and that describes a relationship between a change in a detected orientation of the head mountable display, by which the primary video stream is displayed, and a change in the display of the overlay content; and
   providing, by an output, the primary video stream with the metadata embedded or encoded into the primary video stream.

2. A method according to claim 1, further comprising:
producing the primary video stream to which an overlay is to be applied.

3. A method according to claim 1, further comprising:
receiving, at an overlay rendering unit, the metadata, primary video stream and overlay content; and
rendering the overlay content onto the primary video stream at a location and depth defined by the metadata, to generate a display video stream.

4. A method according to claim 3, further comprising:
displaying the display video stream using the head mountable display.

5. A method according to claim 3, in which the overlay content comprises one or more video streams.

6. A method according to claim 3, in which the overlay content comprises a plurality of overlay content streams.

7. A method according to claim 1, in which the primary video stream represents a three-dimensional video signal.

8. A method according to claim 1, in which the metadata indicating the location comprises metadata indicative of positions with respect to a two-dimensional mask at a lower resolution than a pixel resolution of the primary video stream.

9. A method according to claim 1, in which the metadata indicating the location comprises image coordinate information defining one or more bounding boxes within which overlay content can be displayed.

10. A method according to claim 1, in which the metadata indicating the depth comprises one or more indications of perceived depth relative to a wearer of a head mountable display.

11. A method according to claim 10, in which the metadata indicating the depth defines one or more stereoscopic disparities.

12. A method of processing a primary video stream to apply an overlay for display by a head mountable display, the method comprising:
   receiving, at an overlay rendering unit, a primary video stream, overlay content, and metadata embedded or encoded into the primary video stream and indicative of a location and a depth of suitable regions for the display of the overlay content, a suitable region being a region detected to lack one or more first predetermined features or to include one or more second predetermined features, and that describes a relationship between a change in a detected orientation of the head mountable display, by which the primary video stream is displayed, and a change in the display of the overlay content; and
   rendering the overlay content onto the primary video stream at the location and depth defined by the metadata, to generate a display video stream.

13. A method according to claim 12, further comprising:
displaying the display video stream using the head mountable display.

14. A method according to claim 13, further comprising:
detecting changes in the orientation of the head mountable display; and
varying rendering of the display video stream in response to the detected changes, in a manner defined by the metadata.

15. A machine-readable non-transitory storage medium having computer-readable instructions stored thereon, the instructions, when executed by one or more processors, cause the one or more processors to perform the method of claim 1.

16. Image processing apparatus for processing a primary video stream to which an overlay may be applied for display by a head mountable display, the apparatus comprising:
   a detector to identify one or more suitable regions in the primary video stream for the display of overlay content a suitable region being a region detected to lack one or more first predetermined features or to include one or more second predetermined features;
   a generator to generate metadata indicative of a location and a depth of the suitable regions for the display of the overlay content and that describes a relationship between how a change in a detected orientation of the head mountable display, by which the primary video stream is displayed, and a change in the display of the overlay content; and
   an output to provide the primary video stream with the metadata embedded or encoded into the primary video stream.

17. Image processing apparatus for processing a primary video stream to apply an overlay for display by a head mountable display, the apparatus comprising:
   an overlay rendering unit configured to receive a primary video stream, overlay content, and metadata embedded or encoded into the primary video stream and indicative of a location and a depth of suitable regions for the display of the overlay content, a suitable region being a region detected to lack one or more first predetermined features or to include one or more second predetermined features and that describes a relationship between how a change in a detected orientation of the head mountable display, by which the primary video stream is displayed, and a change in the display of the overlay content;

wherein the overlay rendering unit is further configured to generate a display video stream by rendering the overlay content onto the primary video stream at the location and depth defined by the metadata.

18. A head mountable display system comprising:

the image processing apparatus according to claim 17; and a head mountable display configured to display the display video stream.

19. A machine-readable non-transitory storage medium having computer-readable instructions stored thereon, the instructions, when executed by one or more processors, cause the one or more processors to perform the method of claim 12.

* * * * *